May 12, 1964  J. W. CARLSON  3,132,857
PHOTOCOPYING MACHINES
Filed March 29, 1962  2 Sheets-Sheet 1
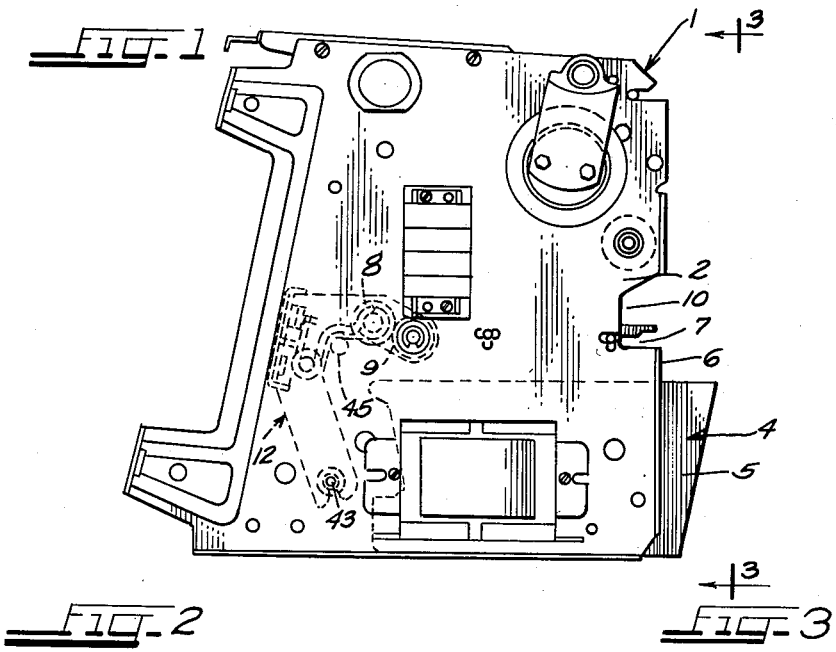
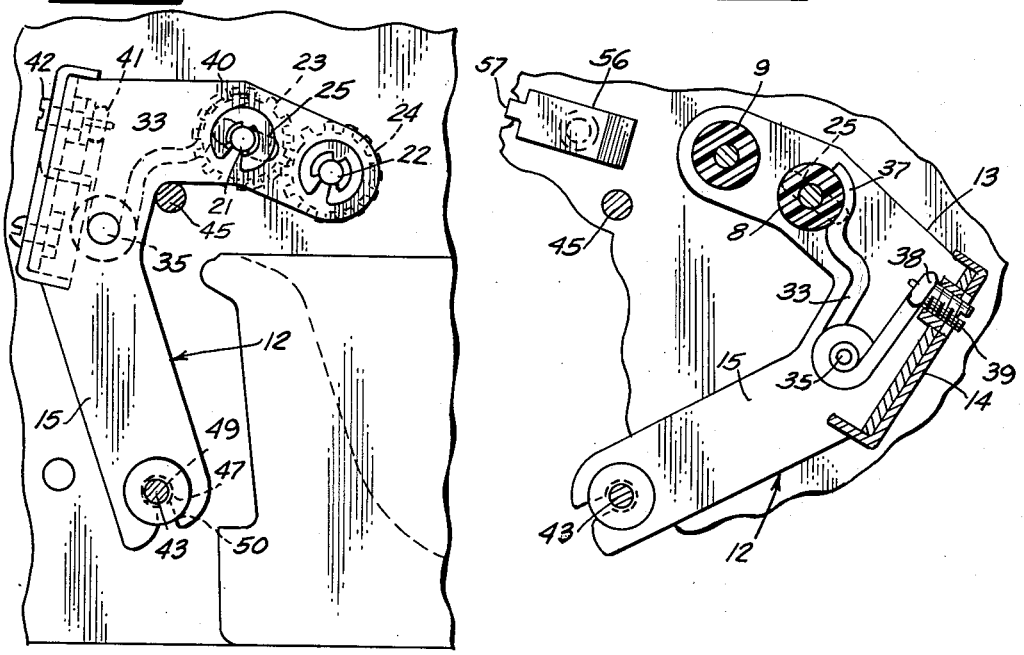
INVENTOR.
JOHN W. CARLSON
BY Marzall, Johnston, Cook & Root
ATT'YS May 12, 1964  J. W. CARLSON  3,132,857
PHOTOCOPYING MACHINES
Filed March 29, 1962  2 Sheets-Sheet 2
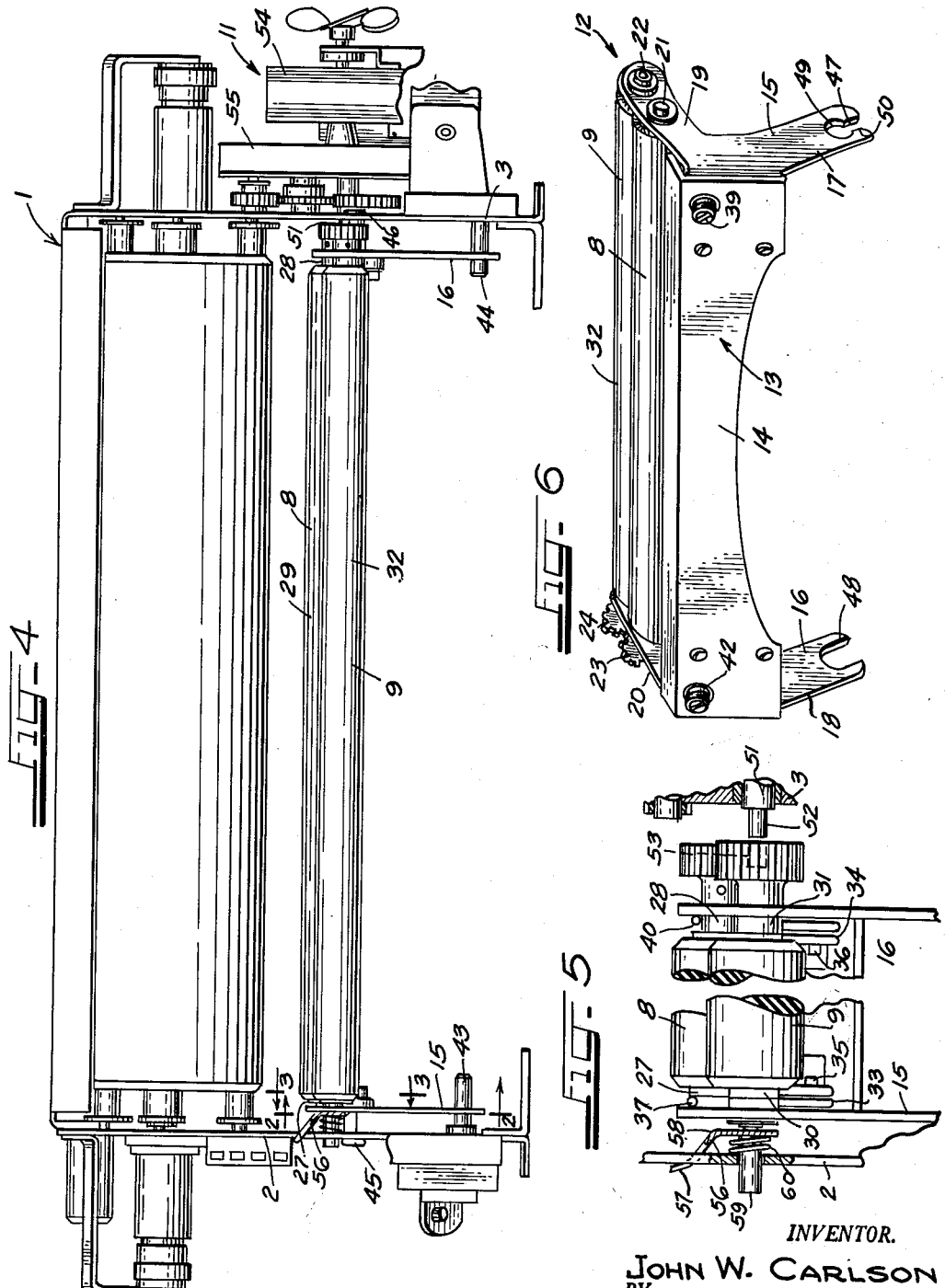
INVENTOR.
JOHN W. CARLSON
BY
Marshall, Johnston, Cook &
Root

United States Patent Office 3,132,857
Patented May 12, 1964

3,132,857
PHOTOCOPYING MACHINES
John W. Carlson, Chicago, Ill., assignor to Speed-O-Print
Business Machines Corporation, Chicago, Ill., a corporation of Illinois
Filed Mar. 29, 1962, Ser. No. 183,640
8 Claims. (Cl. 271—51)

This invention relates to photocopying machines and, more particularly, to roller assemblies which are particularly well adapted for use in photocopying machines, and the like.

It is a primary object of the present invention to afford a novel roller assembly which is particularly well adapted for use in photocopying machines and the like.

In photocopying machines, and the like, when rollers are used for feeding sheets of material through developing liquid, and the like, foreign material, such as crystals formed from the developing liquid, or the like, tend to accumulate on the outer peripheral surface of the rollers. This makes it highly desirable, if not necessary, to clean the rollers from time to time to insure proper operation thereof. It is an important object of the present invention to enable the aforementioned cleaning of such rollers to be quickly and easily accomplished.

Photocopying machines embodying rollers engageable with sheets of material which are wet with developing liquid, and the like, have been heretofore known in the art. However, such machines as have been heretofore known in the art have had several inherent disadvantages, such as, for example, embodying rollers which were non-removable; embodying constructions whereby the rollers were removable only with substantial difficulty; embodying rollers which were not adjustable toward and away from each other; embodying constructions wherein it was difficult to connect the rollers to, and disconnect the rollers from, the drive mechanism therefor embodied in the machine; embodying roller assemblies which were relatively large and massive in size; or embodying roller assemblies which were complicated in construction and operation and which were difficult and expensive to produce commercially, and the like. It is an important object of the present invention to overcome such disadvantages.

Another object of the present invention is to afford a novel roller assembly which may be supported in a photocopying machine, or the like, in a novel and expeditious manner.

Another object is to afford a novel roller assembly which may be quickly and easily mounted in, and removed from, a photocopying machine, or the like.

Yet another object is to enable roller assemblies to be automatically operatively connected to, and disconnected from the drive mechanism therefor upon insertion of the roller assembly into, and removal of the roller assembly from, respectively, operative position in photocopying machines, and the like.

Yet another object of the present invention is to afford novel roller assemblies of the aforementioned type wherein the rollers thereof are adjustable toward and away from each other in a novel and expeditious manner.

Another object is to afford a novel roller assembly of the aforementioned type wherein the rollers are yieldingly urged toward each other in a novel and expeditious manner whereby the position of the rollers relative to each other may automatically adjust to accommodate material of various thicknesses passing between the rollers.

Another object is to afford a novel roller assembly of the aforementioned type which is practical and efficient in operation and may be readily and economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is an end elevational view of the inner housing of a photocopying machine embodying the preferred embodiment of the present invention;

FIG. 2 is a fragmentary detail sectional view of the machine shown in FIG. 1 taken substantially along the line 2—2 in FIG. 4;

FIG. 3 is a fragmentary detail sectional view taken substantially along the line 3—3 in FIG. 4, with certain parts thereof disposed in different positions;

FIG. 4 is a fragmentary front elevationol view of a portion of the photocopying machine shown in FIG. 1;

FIG. 5 is a fragmentary front elevational view of a portion of the photocopying machine shown in FIG. 4, with certain parts disposed in different operative position; and FIG. 6 is a rear perspective view of the roller assembly shown in FIGS. 1 to 5, inclusive.

The inner housing 1 of a photocopying machine, embodying the principles of the present invention is shown in the drawings to illustrate the preferred embodiment of the present invention.

The photocopying machine, of which the inner housing 1 forms a part, may be of any suitable type, but, preferably, is of the same general construction as, and operates in the same general manner as, the photocopying machine disclosed in my copending application for United States Letters Patent, Serial No. 420, filed January 4, 1960, now Pat. No. 3,031,942.

The housing 1 includes two substantially upright, parallel end walls 2 and 3, FIGS. 1 and 4. A tray or tank 4 is normally disposed in the housing 1, with the front edge portion 5 of the tank 4 projecting forwardly from the housing 1. The tank 4 is insertable into, and removable from, the normal operative position thereof, shown in FIG. 1, through the front side 6 of the housing 1. The tank 4 is adapted to hold a quantity of developing liquid, and in the operation of the machine of which the housing 1 forms a part, sheets of photocopying paper are fed inwardly through an entrance 7, down into and through the developing liquid in the tank 4, upwardly between two pressure rollers 8 and 9, and from the pressure rollers 8 and 9 outwardly through an exit opening 10, FIG. 1, as is discussed in greater detail in my aforementioned patent.

In the operation of the photocopying machine of which the housing 1 forms a part, the rollers 8 and 9 are driven by suitable mechanism, such as, for example, the drive mechanism 11 shown in FIG. 4. The rollers 8 and 9 are driven in such a manner by the drive mechanism 11 that the roller 8 rotates in a counterclockwise direction, and the roller 9 rotates in a clockwise direction, as viewed in FIG. 1, so that the rollers 8 and 9 are effective to feed the sheets of photocopying paper passing therebetween along the path of travel followed by the photocopying paper in the operation of the machine.

The rollers 8 and 9 are part of a roller assembly 12, FIGS. 1, 2, 3, and 6, which includes an elongated mounting bracket 13 having a rear wall 14 extending the length thereof. The mounting bracket 13 also includes two end walls 15 and 16, which are of substantially inverted L-shape. The end walls 15 and 16 include downwardly projecting rear legs 17 and 18, respectively, and upper legs 19 and 20 projecting forwardly from the upper end portions of the legs 17 and 18, respectively. The opposite ends of the rear wall 14 are secured to the upper rear edge portions of the rear legs 17 and 18 of the end walls 15 and 16, respectively, by suitable means such as, for example, welding. The rollers 8 and 9 extend between, and are journalled in the front end portions of the legs 19 and 20 of the end walls 15 and 16 of the bracket 13, FIGS. 4 and 6, with the roller 9 disposed forwardly of the roller 8. The rollers 8 and 9 include rods 21 and 22 extending therethrough, and the rods 21 and 22 extend through and are journalled in the end walls 15 and 16.

Two gears 23 and 24 are mounted on the rods 21 and 22 outwardly of and closely adjacent to the end wall 16 of the bracket 13, FIGS. 2, 4, and 6. The gears 23 and 24 are operatively meshed with each other, and are secured to the shafts 21 and 22, respectively, for rotation therewith so that upon rotation of either of the gears 23 or 24 the other gear 24 or 23 is rotated thereby to thereby effect simultaneous rotation of the rollers 8 and 9.

Each of the end walls 15 and 16 of the mounting bracket 13 has an elongated slot or opening 25 formed in each of the legs 19 and 20, respectively, and the opposite ends of the shaft 21 of the roller 18 extend through the respective slots 25. The slots 25 are so positioned in the end walls 15 and 16 that the longitudinal center lines thereof intersect the longitudinal center line of the roller 9 so that movement of the rod 21 longitudinally of the slots 25 is effective to move the roller 8 and the gear 23 directly toward or away from the roller 9 and the gear 24.

Two spacer members 27 and 28 are journalled on the rod 21 between the body portion 29 of the roller 8 and the end walls 15 and 16, respectively, of the mounting bracket 13, FIGS. 4 and 5 to thereby maintain the body portion 29 of the roller 8 in inwardly spaced relation to the end walls 15 and 16. Similarly, two spacer members 30 and 31 are mounted on the rod 22 between the body portion 32 of the roller 9 and the end walls 15 and 16, respectively, to thereby maintain the body portion 32 in inwardly spaced relation to the end walls 15 and 16.

Two torsion springs 33 and 34 are mounted on pins 35 and 36, which are mounted in and carried by the end walls 15 and 16, respectively. As may be seen in FIG. 3, the torsion spring 33 has an end portion 37 disposed in position to engage the spacer member 27 on the roller 8, in position to urge the roller 8 forwardly in the slot 25 in the end wall 15 toward the roller 9. The other end portion 38 of the torsion spring 33 is mounted on the inner end portion of an adjusting screw 39, which extends through and is threadedly engaged with the rear wall 14 of the bracket 13, FIGS. 2, 3, and 6. With this construction, adjustment of the screw 39 inwardly and outwardly relative to the rear wall 14 is effective to increase and decrease, respectively, the pressure with which the spring 33 urges the end of the roller 8 disposed adjacent to the end wall 16 toward the adjacent end of the roller 9. Similarly, the torsion spring 34 has one end portion 40 disposed in engagement with the spacer member 27 on the roller 8, and the other end portion 41 thereof is disposed in engagement with another adjusting screw 42 which extends through and is threadedly engaged with the rear wall 14 of the mounting bracket 13. Like the adjusting screw 39, the adjusting screw 42 is operable to adjust the pressure with which the torsion spring 34 urges the adjacent end portion of the roller 8 toward the roller 9.

With this construction, the pressure with which sheets of material passing between the rollers 8 and 9 are squeezed thereby, may be readily adjusted, and during operation of the machine in which the roller assembly 12 is disposed, the roller 8 may move toward and away from the roller 9 to accommodate various thicknesses of sheet material passing between the rollers.

Two pins 43 and 44 are mounted in the lower end portions of the side walls 2 and 3, respectively, of the housing 1 for a purpose which will be discussed in greater detail presently. The pins 43 and 44 are preferably disposed in axial alignment with each other and project inwardly toward each other only a small fraction of the distance between the end walls 2 and 3. Similarly, the two other pins 45 and 46 are mounted in and project inwardly from the side walls 2 and 3 of the housing 1, FIGS. 1, 2, 3, and 4. The pins 45 and 46 are also preferably disposed in axial alignment with each other and extend toward each other only a small fraction of the distance between the end walls 2 and 3. The pins 45 and 46 are disposed substantially vertically above the pins 43 and 44, respectively, in spaced parallel relation thereto.

The end walls 15 and 16 of the bracket 13 have downwardly opening elongated slots 47 and 48 formed in the lower end portions of the rear legs 17 and 18 thereof, respectively, FIG. 6. The slot 48 is of substantially uniform width throughout its length, and is of such width as to be capable of receiving the pins 44 therein with a relatively snug but freely slidable fit. The slot 47 has a substantially circular-shaped inner end portion 49 and a narrower outer end portion 50, FIGS. 2 and 6. The inner end portion 49 of the slot 47 is of such diameter that it is capable of receiving the pin 43 therein with a relatively snug but freely slidable fit. The end portion 50 of the slot 47 is of smaller width than the diameter of the pin 43 and, therefore, when the pin 43 is disposed within the end portion 50 of the slot 47, it is effectively prevented from removal therefrom longitudinally of the slot 47.

The pins 43—46 are so disposed relative to each other that, when the roller assembly 12 is mounted in the housing 1 in normal operative position, as shown in FIGS. 1 and 2, the pins 43 and 44 are disposed in the inner end portions of the slots 47 and 48, respectively, and the pins 45 and 46 are engaged with the front edge portions of the end walls 15 and 16 at the junction of the legs 19 and 20 with the legs 17 and 18, respectively, FIGS. 1 and 2. The mounting bracket 13 is of such size and shape that by rotation thereof in a counterclockwise direction around the pins 43 and 44, as viewed in FIG. 2, the roller assembly 12 may be swung into position wherein the rollers 8 and 9 and the front edge portions of the legs 18 and 19 of the end walls 15 and 16 are disposed rearwardly of the pins 45 and 46, as shown in FIG. 3. With the roller assembly 12 disposed in the rearwardly extending position shown in FIG. 3, it is merely necessary to move the roller assembly 12 to the right, as viewed in FIG. 4, a sufficient distance to move the leg 15 out of engagement with the pin 43, and the roller assembly 12 may then be removed, directly rearwardly, from the housing 1, the slot 48 being of such size and configuration that the leg 16 may be slid rearwardly off from the pin 44. The walls 2 and 3 of the housing 1 are disposed a sufficient distance outwardly of the end walls 15 and 16, respectively, of the roller assembly 12 to permit the movement of the roller assembly 12 longitudinally of the pin 43 the distance necessary to disengage the end wall 15 of the roller assembly 12 from the pin 43, when the roller assembly 12 is disposed in the rearwardly tilted position shown in FIG. 3.

The drive mechanism 11 includes a shaft 51, journalled in the end wall 3 of the housing 1, FIGS. 4 and 5. The shaft 51 includes a reduced end portion 52 projecting inwardly of the wall 3, the end portion 52 being preferably of substantially rectangular-shape transverse cross-section. The end of the rod 22 of the roller 9, which is disposed adjacent to the wall 3 of the housing 1 when the roller assembly is disposed in operative position in the housing 1, has an opening 53 therein which is complementary in size and shape to the end portion 52 of the shaft 51. Thus, it will be seen that when the end portion 52 of the shaft 51 is disposed in the opening 53 in the rod 22, and the shaft 51 is rotated, it is effective to rotate the roller 9, with its attached gear 24, to thereby rotate the gear 23 and the roller 8.

The mechanism for driving the shaft 5, and thereby rotating the rollers 8 and 9 may be of any suitable type. However, it is preferably of the type shown in my aforementioned patent, and preferably includes an electric motor 54 operatively connected through a suitable reduction gear unit 55 to the shaft 51. With this construction, upon energization of the motor 54, it is effective to rotate the shaft 51 and thereby rotate the rollers 8 and 9 of the roller assembly 12 when the latter is disposed in operative position in the housing 1.

An elongated spring plate 56 having an ear 57 on one end portion thereof is pivotally connected to the end wall 2 by the ear 57, FIGS. 3, 4, and 5. The main body portion 58 of the spring plate 56 is disposed inwardly of the end wall 2 in overlying relation to a pin 59 extending through and slidably mounted in the end wall 2. The body portion 58 is preferably secured to the inner end of the pin 59 by suitable means, such as, for example, welding. A compression coil spring 60 is disposed around the pin 59 between the end wall 2 and the body portion 58 of the spring plate 56, FIGS. 4 and 5. The spring plate 56 is disposed in such position on the end wall 2 that when the roller assembly 12 is disposed in operative position in the housing 1, the body portion 58 of the spring plate 56 is disposed in abutting engagement with the adjacent end of the rod 22 extending through the roller 9, with the rod 22 disposed in substantially longitudinal alignment with the pin 59. The spring plate 56 is so disposed on the end wall 2, and the coil spring 60 is of such length, that when the roller assembly 12 is disposed in the aforementioned operative position in the housing 1, the spring 60 is effective to yieldingly retain the roller assembly 12 in the rightwardmost position, as shown in FIG. 4, wherein the end portion 52 on the drive shaft 51 is engaged in the socket or recess 53 in the rod 22.

The spring plate 56 is so constituted and arranged that the roller assembly 12 may be manually moved to the left from the position shown in FIG. 4 to the position shown in FIG. 5, against the urging of the spring 60, to thereby disengage the rod 22 of the roller 9 from the end portion 52 of the drive shaft 51. With the roller assembly 12 disposed in the position shown in FIG. 5, it may then be rotated rearwardly on the pins 43 and 44 to thereby dispose it in the position shown in FIG. 3. Thereafter, as previously mentioned, the roller assembly 12 may then be moved to the right as viewed in FIGS. 4 and 5 to thereby disengage the end wall 15 thereof from the pin 43, and the roller assembly 12 may then be withdrawn rearwardly from the housing 1.

When it is desired to again mount the roller assembly 12 in the housing 1, this may be readily accomplished by first positioning the slot 48 into operative engagement with the pin 44, with the roller assembly 12 disposed in rearwardly tilted position, as shown in FIG. 3, and with the roller assembly 12 disposed a sufficient distance to the right, as viewed in FIGS. 4 and 5, to dispose the end wall 15 thereof inwardly of the inner pin 43. Thereafter, with the roller assembly 12 held in rearwardly tilted position, it may be moved to the left, as viewed in FIGS. 4 and 5, to dispose the pin 43 in the inner end portion 49 of the slot 47. The roller assembly 12 may then be rotated forwardly in a counterclockwise direction, as viewed in FIG. 3, into position to align the rod 22 with the drive shaft 51. During this last-mentioned movement of the roller assembly 12, the spring plate 56 is cammed by the assembly 12 around its ear 57 inwardly toward the end wall 2 of the housing 1 against the urging of the spring 60. Thereafter, the roller assembly 12 may be permitted to be moved to the right, as viewed in FIGS. 4 and 5, by the urging of the spring 60 to thereby seat the end portion 52 of the drive shaft 51 in the socket 53 in the end of the rod 22 of the roller 9. With the roller 9 thus operatively connected to the drive shaft 51, the roller assembly 12 is again disposed in operative position in the housing 1 wherein energization of the motor 11 will be effective to rotate the rollers 8 and 9.

From the foregoing, it will be seen that I have afforded a novel roller assembly which is particularly well adapted for use in photocopying machines, and the like.

Also, it will be seen that I have afforded a novel roller assembly which may be quickly and easily mounted in, and removed from, operative position in such a machine.

In addition, it will be seen that I have afforded a novel roller assembly wherein two rollers are yieldingly urged toward each other, and the pressure with which they are so urged toward each other may be quickly and easily adjusted in a novel and expeditious manner.

Also, it will be seen that I have afforded a novel roller assembly which is practical and efficient in operation and may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a photocopy machine of the type embodying a housing through which sheets are fed through a predetermined path of travel, and supporting means including two spaced, upstanding supporting members,
    (a) two other supporting members mounted on each of said first-mentioned supporting members,
    (b) two rollers disposed in adjacent relation to each other for feeding such sheets along said path of travel,
    (c) means for rotating said rollers, and
    (d) means for removably mounting said rollers in said housing,
    (e) said last-mentioned means comprising an elongated bracket having substantially parallel end wall portions,
    (f) each of said end wall portions having
        (1) one portion slidably mounted on a respective one of said other supporting members, and
        (2) abutment means abuttingly engaged with the other one of said other supporting members on the same first-mentioned supporting member as said one other supporting member is mounted.

2. In a photocopy machine of the type embodying a housing through which sheets are fed through a predetermined path of travel, and rotatable drive means rotatably mounted in said housing,
    (a) a mounting bracket removably mounted in operative position in said housing,
    (b) two rollers rotatably mounted in said bracket in position to squeeze such sheets between them,
    (c) said rollers being transversely removable from said housing with said bracket as an integral unit therewith, and
    (d) drive means on said rollers in position to automatically operatively engage said first-mentioned drive means for rotation thereby upon insertion of said bracket into said operative position in said housing.

3. In a photocopy machine of the type embodying a housing through which sheets are fed through a predetermined path of travel, and rotatable drive means rotatably mounted in said housing,
    (a) an elongated mounting bracket rotatably mounted in said housing for rotation in a transverse direction,
    (b) two elongated rollers supported by, and rotatably mounted in said bracket in substantially side-by-side, parallel relation to each other, (c) said bracket being mountable in and removable from operative position wherein said rollers are disposed in said path of travel in position to feed such sheets along said path of travel upon rotation of said rollers, and
(d) other drive means carried by and operatively connected to said rollers for so rotating said rollers,
(e) said other drive means being operatively engageable with, and disengageable from, said first-mentioned drive means upon movement of said bracket into, and out of, said operative position, respectively.

4. In a photocopy machine of the type embodying a housing through which sheets are fed through a predetermined path of travel, and rotatable drive means rotatably mounted in said housing,
(a) a mounting bracket,
(b) two elongated rollers supported by, and rotatably mounted in said bracket in substantially side-by-side, parallel relation to each other,
(c) supporting means in said housing,
(d) said bracket being slidably and rotatably mounted on said supporting means for movement thereon into and out of operative position in said housing,
(e) and other drive means operatively connected to said rollers in position to automatically operatively engage said rotatable drive means for actuation thereby upon positioning of said bracket in said operative position.

5. In a photocopy machine of the type embodying a housing, and two upstanding, spaced parallel wall members disposed in said housing,
(a) two pairs of spaced parallel pins,
(b) each of said pairs of pins
(1) being mounted on and supported by a respective one of said wall members and
(2) projecting toward the other of said wall members,
(c) an elongated bracket having
(1) an elongated rear wall, and
(2) parallel opposite end walls disposed substantially perpendicular to said rear wall,
(d) each of said end walls of said bracket including
(1) an elongated downwardly projecting rear leg, and
(2) an elongated upper leg projecting forwardly from the top of said rear leg,
(e) two elongated rollers
(1) extending between and rotatably mounted in the front end portion of said upper legs
(2) in closely adjacent substantially parallel relation to each other for feeding sheet material through a portion of said housing,
(f) means for adjustably urging said rollers toward each other,
(g) said rear legs on said bracket each having a downwardly opening slot in the lower end thereof,
(h) one of said pins in each of said pairs being releasably disposed in a respective one of said slots in underlying supporting relation to a respective one of said rear legs,
(i) the other of said pins in each of said pairs being abuttingly engaged with the front edge of a respective one of said end walls adjacent the juncture of said legs of said wall for limiting forward rotation of said bracket around said one pin.

6. In a photocopy machine of the type embodying a housing, two upstanding, spaced wall members disposed in said housing, and rotatable drive means rotatably mounted in one of said wall members,
(a) two pairs of spaced parallel pins,
(b) each of said pairs of pins
(1) being mounted on and supported by a respective one of said wall members and
(2) projecting toward and terminating short of other of said wall members,
(c) an elongated bracket having
(1) an elongated rear wall, and
(2) parallel opposite end walls disposed substantially perpendicular to said rear wall,
(d) each of said end walls of said bracket including
(1) an elongated downwardly projecting rear leg, and
(2) an elongated upper leg projecting forwardly from the top of said rear leg,
(e) two elongated rollers
(1) extending between and rotatably mounted in the front end portion of said upper legs
(2) in closely adjacent substantially parallel relation to each other,
(f) drive means on said rollers,
(g) said bracket having a normal position wherein
(1) said last-mentioned drive means are operatively engaged with said first-mentioned drive means for operatively rotating said rollers,
(2) the lower end portion of each of said legs is slidably and rotatably mounted on one of said pins of a respective one of said pairs of pins, and
(3) the other pin of each of said pairs of pins is abuttingly engaged with the front edge portion of a respective one of said end walls,
(h) said bracket being axially of said pins to another position wherein said second mentioned drive means are disconnected from said first-mentioned drive means,
(i) said bracket being movable rearwardly from said other position to remove said bracket and rollers from said housing.

7. The combination as defined in claim 6, and
(a) in which one of said rollers is movable toward and away from the other of said rollers, and
(b) which includes means yieldingly urging said one roller toward said other roller,
(c) said last-mentioned means including
(1) two torsion springs
(a') each of said torsion springs having
(1') one end operatively engaged with a respective end of said one roller, and
(2') another end restrainingly held by said bracket, and
(2) two adjusting screws adjustably mounted in in said bracket and operatively engaged with respective ones of said other ends of said torsion springs for moving said last-mentioned other ends toward and away from said other roller to thereby vary the pressure of said springs on said one roller, 8. In a photocopy machine of the type embodying a housing through which sheets are fed through a predetermined path of travel, and rotatable drive means rotatably mounted in said housing,
(a) a mounting bracket removably mounted in operative position in said housing,
(b) two rollers rotatably mounted in said bracket in position to squeeze such sheets between them,
(c) said rollers being removable from said housing with said bracket as an integral unit therewith,
(d) drive means on said rollers in position to automatically operatively engage said first-mentioned drive means for rotation thereby upon insertion of said bracket into said operative position in said housing, and
(e) means for adjusting the position of said rollers relative to each other,
(f) said last-mentioned means comprising
(1) two screws adjustably mounted in said bracket, and
(2) two elongated torsion springs, (g) one end of each of said torsion springs being operatively connected to a respective end of one of said rollers, and
(h) the other end of each of said springs being mounted on a respective one of said screws in position to be moved thereby relative to said other end of said spring upon adjusting movement of said respective screw.

References Cited in the file of this patent
UNITED STATES PATENTS

| | | |
|---|---|---|
| 2,321,154 | Perrin et al. | June 8, 1943 |
| 2,561,503 | D'ornellas | July 24, 1951 |